United States Patent [19]

Keller

[11] 4,259,385
[45] Mar. 31, 1981

[54] EXPANDED REINFORCING SHEET MATERIAL, ITS METHOD OF MANUFACTURE, AND SHEET MATERIAL REINFORCED THEREWITH

[75] Inventor: Robert N. Keller, Utica, Mich.

[73] Assignee: National Steel Corporation, Pittsburgh, Pa.

[21] Appl. No.: 10,791

[22] Filed: Feb. 9, 1979

[51] Int. Cl.³ .................................. B32B 3/10
[52] U.S. Cl. ..................... 428/135; 428/116; 428/136; 428/137; 428/138; 428/344; 428/349; 428/354; 428/320; 428/322; 428/596
[58] Field of Search ................ 156/197; 428/116, 117, 428/118, 119, 131, 134, 135, 136, 159, 161, 165, 166, 200, 256, 313, 316, 320, 321, 322, 137, 138, 344, 346, 347, 349, 354, 596

[56] References Cited

U.S. PATENT DOCUMENTS

| | | | |
|---|---|---|---|
| 2,001,632 | 5/1935 | Schlichting | 428/116 |
| 2,261,307 | 11/1941 | Still | 428/136 |
| 2,349,907 | 5/1944 | Kos et al. | 189/46 |
| 2,371,754 | 3/1945 | Gillum et al. | 189/34 |
| 2,434,232 | 1/1948 | Singleton | 154/129 |
| 2,820,228 | 1/1958 | Rodman | 4/173 |
| 3,308,597 | 3/1967 | Simonton | 52/635 |
| 3,535,198 | 10/1970 | Bloom | 428/313 |
| 3,650,865 | 3/1972 | Hawkes et al. | 156/119 |
| 3,673,057 | 6/1972 | Fairbanks | 156/256 |
| 3,769,145 | 10/1973 | Gresham et al. | 428/118 |
| 3,813,743 | 6/1974 | Harrell et al. | 29/6.2 |
| 3,872,201 | 3/1975 | Paul et al. | 264/55 |
| 3,884,646 | 5/1975 | Kenny | 29/191.4 |

OTHER PUBLICATIONS

L & L Products, Inc., *Expanding Adhesive Sealant-/Molded PVC Foam Products*, etc.

*Primary Examiner*—William R. Dixon, Jr.
*Attorney, Agent, or Firm*—Shanley, O'Neil and Baker

[57] ABSTRACT

A composite expanded sheet reinforcing material especially useful as a stiffening, vibration and sound dampening, reinforcing laminate, and methods of manufacturing such sheet reinforcing material and of reinforcing articles therewith are disclosed. Formable sheet material having a layer of a foamable adhesive laminated thereon is passed through an expanding apparatus which forms rows of spaced, longitudinally staggered slits through the laminated sheet to form a series of elongated strands integrally joined at their ends by a series of joints or bonds. The slit material is expanded in a direction transverse to the longitudinal direction of the slits, causing the adhesive-coated surfaces of the strands and joints to be inclined at an acute angle to the principal plane of the formed reinforcing sheet. The formed reinforcing sheet may then be laminated onto a surface which is to be reinforced by placing the adhesive-coated surface of the strands and joints in juxtaposed relation to the surface and activating the adhesive.

21 Claims, 19 Drawing Figures

EXPANDED REINFORCING SHEET MATERIAL, ITS METHOD OF MANUFACTURE, AND SHEET MATERIAL REINFORCED THEREWITH

BACKGROUND OF THE INVENTION

1. Field of the Invention

This invention relates to an improved expanded sheet reinforcing material and more particularly to an expanded formable sheet material having a layer of a foamable adhesive adhered to selected surfaces, to methods of manufacturing such expanded sheet material, to methods of reinforcing articles and articles reinforced with such sheet reinforcing material.

2. Description of the Prior Art

Expanded formable sheet material is well-known and widely used for a variety of purposes and apparatus is commercially available for making such expanded sheet material either in a continuous or intermittent operation. In the continuous type of expanding apparatus, an elongated sheet or strip of formable material, for example sheet plastic, steel, aluminum, copper, or other formable material sometimes referred to hereinafter generally as structural sheet material, is fed past a slitting station where a series of parallel, laterally spaced, longitudinally off-set rows of slits are formed through the sheet. The slit sheet is then expanded, or stretched, in a direction transverse to the direction of movement through the apparatus to separate or open the slits. The expanded sheet material may then be coiled or cut into individual sheets, as desired.

The intermittent process, widely used in the production of expanded sheet metal, involves the use of a die having a plurality of spaced shearing sections or teeth which form the slits by shearing the sheet transverse to its width and simultaneously press the sheared portions of the metal downwardly out of the plane of the unsheared sheet to expand the metal. After each shearing and forming stroke, the die is retracted and either the die or the sheet is moved laterally and the sheet is indexed forward before the next shearing and expanding stroke of the die. This intermittent sheet expanding method, preferred in the practice of the present invention, is generally disclosed in U.S. Pat. Nos. 1,448,109 and 1,561,272.

Various configurations of the die can be used in the intermittent apparatus to provide various shapes of openings as well as different configurations of the strands and joints in the expanded material, though the conventional expanded metal is formed with generally diamond-shaped openings defined by substantially straight-sided strands and joints. In the description of the present invention, the openings will be referred to as generally diamond-shaped, it being understood that the exact configuration is not critical and that such description is intended to include openings of various configurations defined by the interconnected strands and joints.

It is known to employ expanded sheet metal as a stiffener or reinforcing laminate for articles made of sheet metal by attaching the expanded material directly to a surface of the sheet. This concept is shown, for example, in U.S. Pat. No. 2,349,907 wherein flat-rolled expanded sheet metal is spot welded to one surface of a thin sheet metal structural element such as the inner surface of a door panel of an automobile to provide a composite structure having increased stiffness and higher strength than available from flat sheet metal of equal weight.

U.S. Pat. No. 2,820,228 discloses the use of expanded metal to reinforce and stiffen the bottom of a drawn sheet steel bathtub. The reinforcing is rigidly secured to the outer surface of the bottom panel by welding before the usual enamel coating is applied. Again, the expanded metal reinforcing material is rolled to lie flat against the bottom of the tub, and the two metal components are stated to be preferably rigidly joined throughout substantially their entire contact area, although the patent also states that spot welding can be used if the spot welds are sufficiently close to preclude relative movement upon flexing of the bottom of the tub.

While flat-rolled expanded metal has been used as a reinforcing and stiffening laminate for thin sheet metal as disclosed in the above mentioned patents, substantial bending strength, or stiffening ability, may be lost by rolling the expanded metal to the flat state. This may be particularly true for expanded sheets in which the width of the individual strands, i.e., the distance between successive shear lines formed in the material, is substantially greater than the thickness of the original sheet material. When unflattened or unrolled expanded metal is laminated onto a smooth surface, the strands and joints are disposed at a relatively large, acute angle to the cover sheet making the effective thickness of the laminated structure substantially greater than the combined thickness of the cover sheet and the thickness of the sheet material from which the expanded sheet was formed.

Expanded sheet material, as formed on commercial expanding equipment generally has not met widespread use as a stiffening or reinforcing laminate for continuous thin sheets. This is believed to be due, at least in part, to the configuration of the expanded metal which only permits a very small surface area contact between such an expanded sheet and a continuous surface. Such contact is limited to the inclined sheared edges of the joint portion of the expanded metal only, with the edges of the individual strands being spaced from the continuous surface. This limited contact makes effective spot welding or joining by other conventional means very difficult.

U.S. Pat. No. 2,371,754 discloses the concept of stiffening a lightweight, thin sheet material by attaching a uniform pattern of wire to one surface of the sheet of material This patent discloses various forms of welding for attaching the reinforcing wires to the surface of the sheet, and also suggests cementing the wire to the sheet; however, neither the nature of the cement contemplated nor the manner of applying it are disclosed. It is noted, however, that the reinforcing wires are fused together where they are crossed so that, as in the case of the flat-rolled expanded sheet, the wires lay in direct surface-to-surface contact with the sheet metal throughout their full length.

SUMMARY OF THE INVENTION

According to the present invention, an expanded sheet reinforcing material is provided which can readily be secured directly to a continuous surface, for example, the surface of a continuous sheet constituting a portion of a structural panel or the like. The reinforcing sheet is a composite structure consisting of an expanded structural sheet material having one face of the strands and joints coated with an adhesive material which may be activated to expand or increase its volume as by foaming to firmly bond the expanded sheet to a contiguous surface. The adhesive used is preferably of the type which is normally in a stable, self-supporting, non-tacky condition so that it can readily be handled, and which is sufficiently resilient to enable the adhesive and expanded base material to be formed as necessary to conform to a surface to which the reinforcing sheet is to be attached.

In order to avoid confusion of terms, the adhesive material employed in the present invention will be referred to as a foamable or foaming adhesive, it being understood that this term is intended to include any form of volume expansion, whether or not accomplished by an actual foaming action. Similarly, the terms "expanding" or "expanded" are used herein to refer to the process of spreadng or extending the lateral expanse of a sheet material as in the well established expanded metal art.

The expanded reinforced sheet material according to this invention may be formed by bonding an adhesive in sheet form, e.g., a preformed sheet of rubber based adhesive, directly to one surface of a formable high-strength sheet material such as sheet or strip steel. The adhesive-structural sheet laminate can then be passed through an expanding apparatus and the composite expanded in the conventional manner for forming expanded sheet metal.

Heat-activated foamable rubber based adhesive material which expands, bonds and seals upon exposure to moderate heat, for example, heat within the range of about 250° F. to 375° F., is commercially available in sheet form. The volume expansion of such commercially available adhesive may be up to 150% or more, depending upon the time of exposure to and intensity of the activating heat. Such a foamable adhesive sheet may be permanently bonded to the structural sheet base by initially heating the structural sheet and pressing the sheet of adhesive material into firm contact with the heated sheet by passing the two through a pair of pinch rolls. The heat in the structural sheet is controlled to be sufficient to activate the surface portion only of the adhesive sheet to produce a firm bond. The laminated structure may be quickly cooled to prevent excessive activation and foaming of the adhesive material.

The structural strip—foamable adhesive laminate can then be passed directly into a metal expanding apparatus, preferably of the intermittent type referred to above, where the composite is simultaneously slit and shaped so that one face of all of the joints and strands are completely covered with the adhesive after the forming operation. The expanded structural sheet thus formed can be handled in the conventional manner for expanded metal, for example, by rolling into coils or cutting into sheets. Preferably, a separator sheet of suitable paper or the like is deposited on the surface of the formed matrix before coiling or stacking to minimize the likelihood of damage or disruption of the adhesive layer.

In an alternate embodiment of the invention, a suitable adhesive material is laminated between two structural sheets, or strips, and the laminated composite then passed through the expanding apparatus so that the foamable adhesive is confined between the opposed surfaces of adjacent strands and joints of the two expanded structural sheets. Upon activation, the foamable adhesive is extruded out from between the confining structural sheet components to engage and form a firm bond with an adjacent surface. This embodiment of the reinforcing material may be utilized as a spacing core between two cover sheets, with the core acting to firmly adhere the two sheets together to provide a lightweight high-strength honeycomb-type sandwich structure.

BRIEF DESCRIPTION OF THE DRAWINGS

Other features and advantages of the present invention will become apparent from the detailed description contained hereinbelow, taken in conjunction with the drawings, in which.

DESCRIPTION OF THE PREFERRED EMBODIMENT

Figures 1, 2, 3, 5:
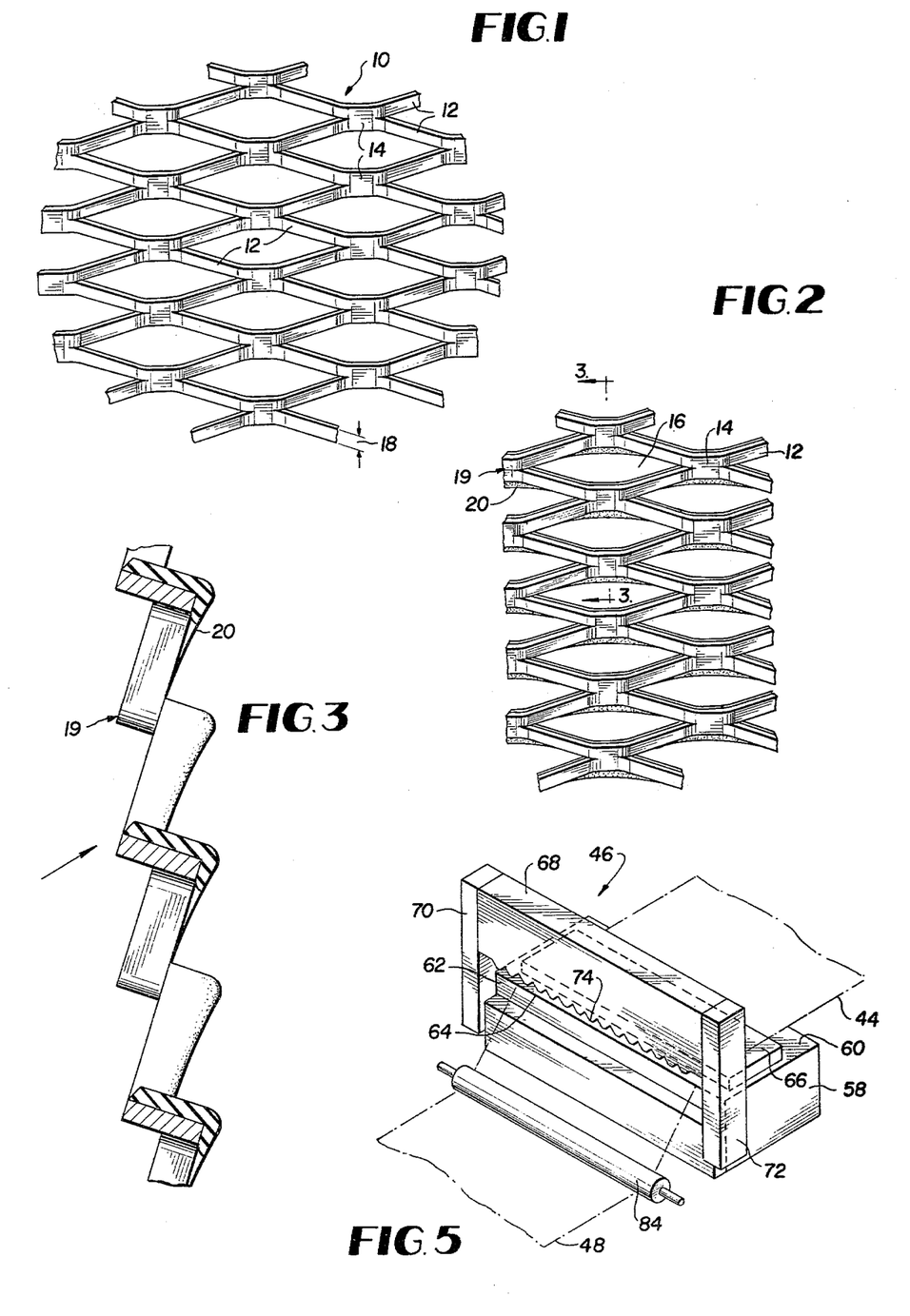
FIG. 1 is a perspective view of a fragment of a sheet of expanded metal formed on conventional metal expanding apparatus.
FIG. 2 is a view similar to FIG. 1 and showing a fragment of an expanded reinforcing sheet according to the present invention.
FIG. 3 is an enlarged sectional view taken on line 3—3 of FIG. 2.
FIG. 5 is a perspective view schematically showing an intermittent type sheet metal expanding apparatus being utilized to form an expanded reinforcing sheet according to the present invention.

Referring now to the drawings in detail, a fragment of an expanded sheet of formable structural material, typically sheet metal, is shown in FIG. 1 and designated generally by the reference numeral 10. The expanded sheet 10 is made up of a plurality of staggered rows of elongated sheared strands 12 joined together by integral connecting joints 14, sometimes referred to as bonds or bridges, with the strands and joints cooperating to form a uniform pattern of generally diamond-shaped openings 16. The expanded sheet 10 is conventionally formed from a continuous sheet or strip of relatively thin flat-rolled metal, utilizing commercially available expanding apparatus in which staggered rows of strands 12 are cut from the sheet by a slitting or shearing operation depending upon the type of apparatus employed. In the practice of the present invention, it is preferred to employ the intermittent type of forming apparatus in which the flat sheet is fed in intermittent increments through the apparatus, with each increment of feed corresponding to the width of the individual strands 12, this width being indicated by the opposed arrows at 18 in FIG. 1, and the width of the joints being double the width of the individual strands. The thicknss of the strands and joints is, of course, substantially equal to the thickness of the original structural sheet from which the expanded sheet is formed. Preferably the strand width is at least equal to the original sheet-metal thickness and may be several times the metal thickness. An increase in strand width results in a corresponding overall reduction in metal expansion. As a general rule, strand width will not be more than about six times the metal thickness.

Referring now to FIGS. 2 and 3, an expanded reinforcing sheet according to the present invention is illustrated as comprising an expanded structural sheet 19 of the type shown in FIG. 1 with a coating 20 of foamable adhesive firmly bonded directly to the face of each strand and joint on one side of the sheet. The adhesive coating 20 is a continuous coating, completely covering the surface portions of the expanded metal sheet 19 which, before expanding, constituted one face surface of the structural sheet.

Figure 4:
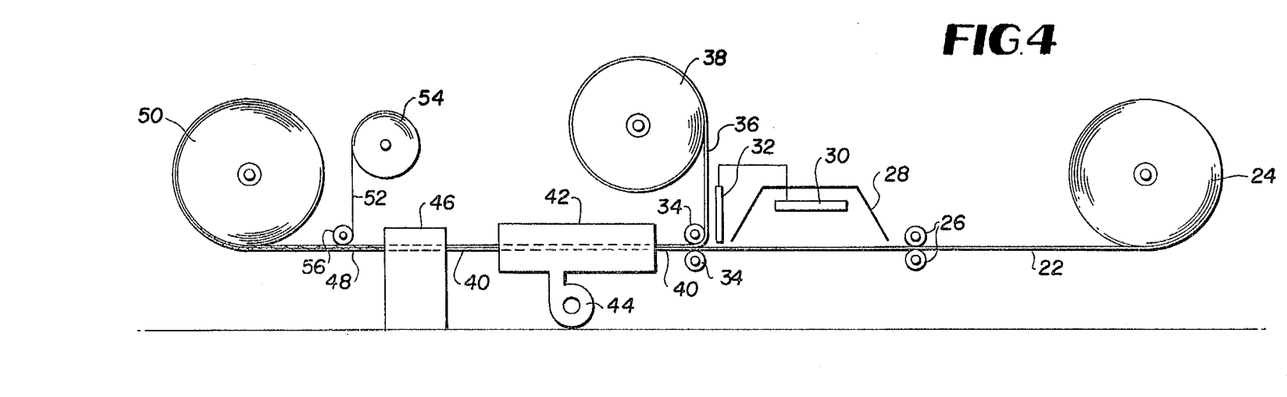
FIG. 4 is a schematic view showing an apparatus for forming the reinforcing structural sheet according to the present invention.
Figures 6, 8, 9:
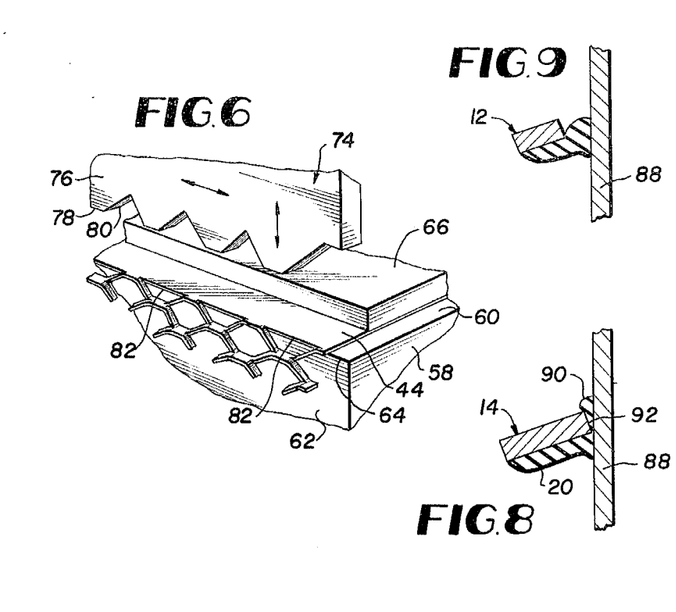
FIG. 6 is an enlarged perspective view of a portion of the apparatus shown in FIG. 5.
FIG. 8 is an enlarged sectional view taken on line 8—8 of FIG. 7.
FIG. 9 is an enlarged sectional view taken on line 9—9 of FIG. 7.

Apparatus suitable for forming an expanded reinforcing sheet according to the present invention is schematically shown in FIGS. 4–6. As illustrated, a running length or strip 22 of flat, relatively thin structural material, for example flat-rolled steel in strip form, is fed from a coil 24 by a pair of driven pinch rolls 26. From rolls 26, strip 22 passes beneath a hood 28 housing suitable heating means such as the infra-red heater 30 spaced closely above the top surface of the strip 22. As the heated strip 22 emerges from beneath hood 28, a temperature sensor 32 senses the temperature of the top surface of the strip. Sensor 32 is connected in a suitable control circuit for heater 30 to maintain the surface temperature of strip 22 at the desired level for reasons described more fully hereinbelow.

Immediately after passing beneath the temperature sensor 32, strip 22 passes through the nip of a pair of silicon rubber-covered pinch rolls 34 which cooperate to firmly press a preformed sheet 36 of a suitable adhesive such as a rubber based, heat activated foamable adhesive onto the top surface of the heated strip 22. The adhesive sheet 36, in continuous strip form, is fed from a roll 38 supported above the path of the strip 22.

The temperature of strip 22 is controlled so that the heat contained therein is sufficient to immediately activate the foamable adhesive at the structural sheet-adhesive interface but insufficient to activate the entire body of adhesive. This assures a firm, continuous bond between the sheet adhesive and the structural sheet base without affecting the major portion of the adhesive body. In order to assure minimum activation of the adhesive, the laminate 40 can be passed immediately from the laminating rolls 34 into a cooling chamber 42 where cooling air, supplied by a suitable blower 44, quickly extracts residual heat from the strip 22. Since the strip 22 is quickly cooled after having the foamable adhesive laminated thereon, and since such adhesives are conventionally relatively poor heat conductors, the heat from the strip is prevented from activating the adhesive substantially beyond the interface of the adhesive and the structural strip. Thus, for all practical purposes, the foamable adhesive remains unactivated, though firmly bonded to the strip 22.

The laminate 40 can be passed directly from the cooling chamber 42 into a metal expanding apparatus 46 where the layer of adhesive 36 and structural strip 22 are simultaneously sheared and expanded as more fully described hereinbelow with reference to FIGS. 5 and 6. From the expanding apparatus 46 the expanded reinforcing sheet, or matrix, 48 may be cut into individual lengths if desired or would into a coil 50 illustrated in FIG. 4. Preferably, a separator sheet 52 of a suitable weight paper or the like, fed from a suitable source such as supply roll 54, is deposited on the top surface of the expanded sheet 48, as by use of roll 56, before the reinforcing sheet is wound into a coil. The purpose of the separator sheet 52 is to minimize the likelihood of tearing or otherwise damaging the foamable adhesive laminate in the coiling and uncoiling process, or during handling coils or sheets or the material.

Referring now to FIGS. 5 and 6, operation of the expanding apparatus 46 is schematically illustrated to show the expansion of the laminated sheet 40. Such expanding apparatus is commercially available and well-known to those skilled in the art and therefore the structure and operation of the apparatus will only be described herein to the extent necessary to fully understand the method of forming the novel expanded reinforcing sheet material of the present invention. Thus, expanding apparatus 46 includes a support bed 58 having a horizontal top surface 60 which intersects a vertical front surface 62 at right angles to define a straight, relatively sharp cutting or shearing edge 64. A holddown plate, or block, 66 may be provided above horizontal surface 60 to intermittently clamp and hold a sheet of material being fed through the apparatus during the cutting and expanding operation.

A cutting and expanding die assembly 68 is mounted above support bed 58 in position to cooperate with the cutting edge 64 and vertical surface 62 to shear and expand sheet material fed through the apparatus. Cutting and expanding die assembly 68 is illustrated as being supported by columns, or posts, 70, 72 which are vertically reciprocated by suitable means, not shown, and moved laterally to stagger the rows of slits, or cuts, formed in the sheet material to be expanded.

The cutting and expanding die assembly 68 includes a shearing plate 74 having a plurality of cutting teeth 76 formed on its bottom edge. The cutting teeth 76 each have a substantially flat, generally rectangular bottom end 78, with the width of end 78 in the direction parallel to the cutting edge 64 generally corresponding to the length of the joints 14, i.e., the distance between successive shear lines in a row. The surfaces 80 of the respective teeth outboard of bottom ends 78 extend upwardly at an angle to intersect the corresponding surfaces on the adjacent teeth to give the bottom edge of shearing plate 74 a saw-toothed appearance.

In operation of the expanding apparatus 46, suitable means (not shown) are provided to advance the sheet material to be expanded, i.e., the laminate 40, in increments equal to the width 18 of the individual strands 12, with the incremental feeding of the sheet being synchronized with movement of the cutting and expanding die. Also, clamping plate 66 is raised and lowered, by conventional means not shown, in synchronization with the feeding of the sheet to firmly clamp and hold the sheet during the shearing and expanding step, and to release the sheet for feeding.

When the laminated sheet 40 is advanced to overhang the shearing edge 64 by a distance equal to the width of a strand, shearing plate 74 is lowered so that the bottom end 78 of each tooth 76 initially engage the top, adhesive coated surface of the laminate, and then proceed downwardly to simultaneously shear the laminated adhesive 36 and structural strip 22 along spaced shear lines 82. As the laminated sheet 40 is sheared, the flat rectangular end 78 of teeth 76 press the sheared segments downwardly along the vertical face 62, thereby elongating the strands 12. This expands the sheet 40 by forming openings in the shape of isosceles trapezuids when viewed from the front of the apparatus. During this shearing and expanding step, the adhesive material covering the sheared segments is clamped between the structural strip 22 and the surfaces 78, 80 of the teeth 76.

Upon completion of the shearing operation, plate 74 is raised and shifted laterally so that the flat bottom end 78 is positioned directly above the unsheared section between adjacent, previously formed shear lines 82. At the same time, clamping plate 66 is released and sheet 44 is indexed through the apparatus a distance equal to the width of one strand. The sheet is then clamped and the operation repeated, forming another row of shear lines 82 in offset relation to the initially formed line and converting openings formed in the previous stroke to a generally diamond-shaped configuration. As shown in FIG. 5, as this shearing and expanding operation is repeated, the expanded sheet 48 is guided downwardly around a guide roll 84 then fed to a suitable coiling or winding apparatus as illustrated in FIG. 4.

As shown in FIGS. 2 and 3, it has been found that, by using a relatively resilient rubber based adhesive material laminated onto a relatively high-strength structural strip base, the adhesive can be drawn or caused to roll around the sheared edge of the base strip on one side of the strands and joints. This drawing, or forming of the resilient adhesive results from tensile stresses produced during the expanding or elongating of the strands, and is most evident at the unsupported joint portion between shear lines 82. Thus, as one joint portion is engaged and pressed downwardly by the flat bottom end 78 of a shearing tooth 76, tensile stresses are set up in the top adhesive laminate, causing the adhesive material to be drawn outwardly and over the unsupported edge of the unsheared portion as the shearing plate progresses downwardly in its shearing and expanding movement. As a result, maximum flow of the adhesive over the edge occurs at the joints and reduces gradually along the length of the strand as most clearly seen in FIG. 3.

The resilient adhesive always tends to be drawn around the same side edge of the joints and strands. This materially assists in positively forming a high-strength bond between the reinforcing sheet and a surface of another article since, by placing this edge toward the surface, the adhesive will extend between the joints and the surface. Also, in this position, the face surface of the joints and strands having the adhesive thereon forms an acute angle with the surface to be reinforced. This results in a tendency for the adhesive, when activated, to expand in the direction of such surface. This tendency is increased by any residual stresses in the adhesive as a result of its having been drawn around the sheared edges, with the result that a complete bond is formed between the expanded reinforcing sheet and the continuous surface positioned in contact therewith as illustrated in FIGS. 7–9.

Figure 7:
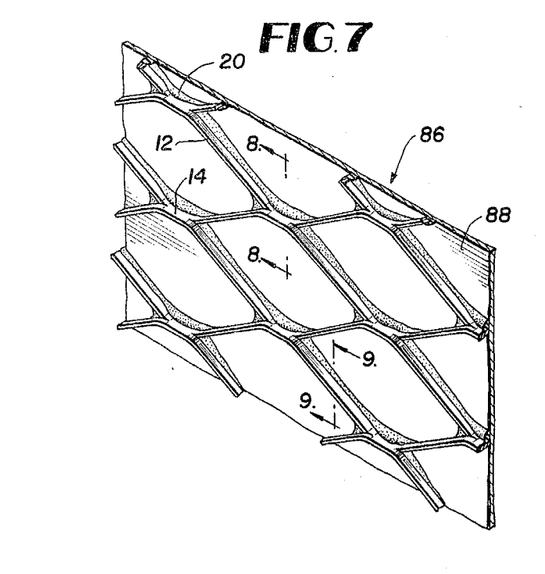
FIG. 7 is a fragmentary perspective view of a section of reinforcing sheet material according to the present invention bonded to a cover sheet.

FIG. 7 illustrates, on an enlarged scale, a reinforced structural panel 86 comprising a section of an expanded reinforcing sheet of the type described above bonded to one surface of a thin plate or sheet 88 such as a metal sheet employed as a door panel or hood of an automobile. This perspective view shows the side faces of the strands 12 and joints 14 of the expanded structural sheet which do not have the layer of adhesive bonded thereto, and illustrates the manner in which the foamable adhesive, when activated, increases its volume and forms a bond between the full length of the joints and strands and the smooth surface of sheet 88. This feature is further illustrated in FIGS. 8 and 9. Thus, in FIG. 8, a joint 14 of the rigid strip 22 is shown to be firmly bonded to the flat surface of metal sheet 88 by the adhesive material 20 which as been activated or foamed to enlarge its volume. It is seen that a portion 90 of the foamed adhesive material extends beneath the sheared edge 92. This portion 90 of the adhesive material was drawn from the face of the joint around the sheared edge 92 during the expanding operation in forming the reinforcing sheet. It is also seen that the adhesive extends upwardly from the surface of sheet 88 along the face of the joint which makes an acute angle with the plane of the sheet.

FIG. 9 is a sectional view of a portion of the assembly shown in FIG. 7 taken through one of the strands 12 of expanded reinforcing sheet at a point spaced a substantial distance from the joints. Contact between the sheared edges 92 of the joints and the flat surface of sheet 88 spaces the strands from the surface of sheet 88 due to the angle of the strands as illustrated in FIG. 3. The substantial volume increase of the foamable adhesive material and the position of the strands with the adhesive coated face making an acute angle with the surface of sheet 88 results in the volume growth of the adhesive being directed toward the sheet to form a bond along the full length of the strands. This tendency of the adhesive's volume growth to be directed toward the sheet 88 is increased by the adhesive being drawn at least paritally around the sheared edges facing the surface of sheet 88.

An important contribution of the present invention resides in the selection of a foamable expanding adhesive which can be firmly adhered to the flat surface of the base structural sheet before the laminated structure is expanded, with the bond being able to withstand the substantial stresses inherent in the expanding operation. Also, the adhesive material should have substantial shelf-life after being bonded to the base sheet, and the expanded composite reinforcing sheet should be capable of being handled and shaped or formed without substantial disruption to the bond between the adhesive material and the expanded structural strand before the adhesive is activated.

One commercially available adhesive product which has been found to be particularly well adapted for use in the present invention is adhesive number L-1025 marketed by L & L Products, Inc. of Romeo, Michigan. This is heat-activated foamable rubber based adhesive which has a volume expansion of 80% to 150%, or more, depending upon the intensity of and time of exposure to the activating heat. The activating temperature and exposure time is within the range frequently employed in paint bake cycles, for example temperatures within the range of 250° F. to 375° F. for times of 10 to 30 minutes. The adhesive has a strength of 20 to 50 lbs/in$^2$ and provides a good bond with both plastics and metals, including oily steel. It is available commercially in relatively thin preformed sheets or coiled strips which are self-supporting and which can be handled in a manner similar to sheet rubber. The adhesive in coiled strip form can readily be laminated onto the surface of a base material such as strip metal with automatic apparatus of the type described hereinablve. After foaming, this adhesive remains flexible over a wide range of temperatures, and provides excellent vibration dampening and sound insulating qualities when the reinforcing sheet according to the present invention is bonded to a thin structural sheet.

Referring now to FIGS. 10-19, an alternate embodiment of the expanded reinforcing sheet according to the present invention, and a method of producing such expanded reinforcing sheet are illustrated wherein a single sheet 100 of foamable adhesive material is supplied from a coil 102 and fed between two continuous strips 104, 106 of formable structural material, supplied from coils 108, 110, respectively. A first heater hood 112 having a heater 114 supported therein is positioned adjacent strip 104 and a second hood 116 having a heater 118 supported therein is mounted adjacent the strip 106. Heaters 114, 118 are controlled by heat sensing elements 120, 122, respectively for sensing the temperature of the structural strips as they exist from beneath the respective hoods. The heated strips 104, 106 are then guided around a pair of driven, silicon rubber covered pinch rolls 124, 126 which press the heated strips into firm engagement with the rubber based adhesive sheet 110, one on each side thereof. The structural strip-adhesive laminate sheet 128 passes from the nip of rolls 124, 126 into a cooling tunnel 130 where cooling air, supplied by a suitable blower 132, quickly cools the heated strips to terminate the heat activation of the adhesive. From the cooling hood 130, the laminate 128 may be coiled or cut into sheets for storage before subsequent expansion or alternatively the running length of laminate can be passed directly through an expanding apparatus 46 as described above, with the expanded reinforcing sheet 134 being wound into a coil as shown at 136 or cut into sheets for subsequent handling and use or storage.

The expanded composite reinforcing sheet shown in FIGS. 12-19 may be considered to consist of two separate expanded structural sheets of the type illustrated in FIG. 1 disposed in parallel, overlying, interfitting relation and joined by the single sheet of adhesive material, and accordingly, a further detailed description of this composite structure is not believed necessary. Components of the structure, including the strands and joints of the respective expanded base sheets are, accordingly, indicated in the various FIGS. by reference numerals corresponding to those employed with respect to the initially described embodiment of the invention.

Figures 10, 11, 12, 13:
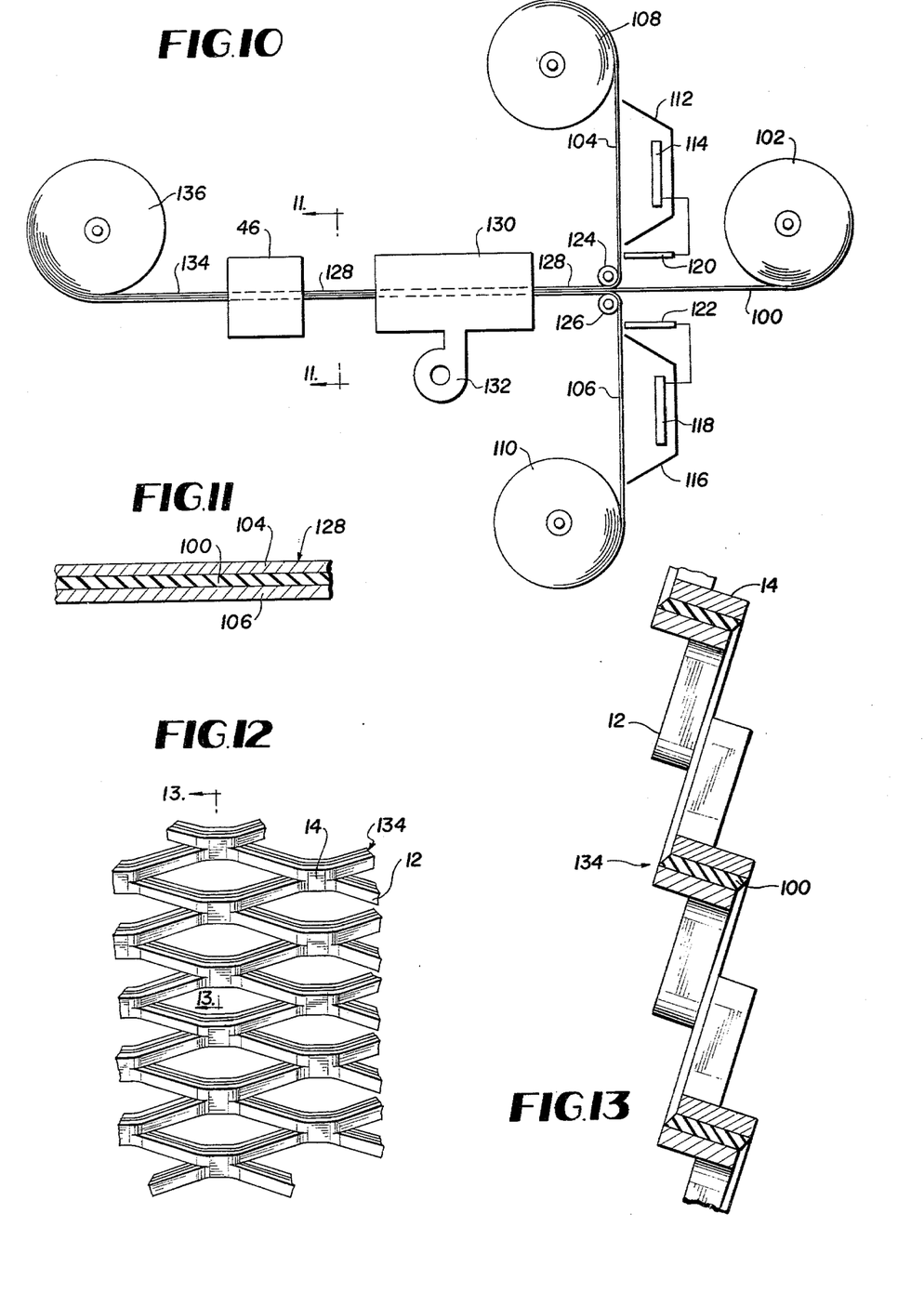
FIG. 10 is a schematic illustration of an apparatus for forming an alternate embodiment of the expanded reinforcing sheet according to the present invention.
FIG. 11 is an enlarged sectional view taken on line 11—11 of FIG. 10.
FIG. 12 is a perspective view of a fragment of a reinforcing sheet formed on the apparatus of FIG. 10.
FIG. 13 is an enlarged sectional view taken on line 13—13 of FIG. 12.

The expanded reinforcing sheet 134 differs from the expanded reinforcing sheet 48 described above in that the adhesive sheet 100 has both surfaces bonded to a structural sheet and the expanding process does not result in the wrap-around or drawing of the adhesive over the sheared edges. The stresses can result in the top structural strip (e.g. strip 104 in FIG. 10) being shifted slightly with respect to the bottom sheet during the expanding operation as illustrated in FIG. 13. Any such shifting which does occur is not sufficient, however, to materially affect the appearance of the structure.

Although the foamable adhesive sheet does not wrap-around the sheared edges in the sandwich type construction of this alternate embodiment, a good bond can be obtained between the expanded reinforcing sheet and a smooth surface of another article upon activation of the adhesive. Since the adhesive is confined between two relatively rigid structural elements, activation of the adhesive causes it to be extruded from between the adjacent constraining surfaces. This extruding effect results in a substantially equal amount of the foamed adhesive material flowing outward from between the adjacent surfaces of the strands and joints on both sides of the expanded reinforcing sheet as illustrated in FIGS. 15-19.

As with the embodiment of the invention employing only single expanded structural sheet, it is important that the foamable adhesive employed in this embodiment have sufficient strength and dimensional stability to withstand the forces necessary to shear and expand the laminated structure, and to retain the two expanded structural sheets in their interfitting juxtaposed relation after the shearing and expanding operation, to enable the expanded composite assembly to be handled, cut, and shaped as necessary for attachment to a surface of an article to reinforced or stiffened. The rubber based, heat-activated foamable adhesive described above has been found to meet these requirements.

Figure 14:
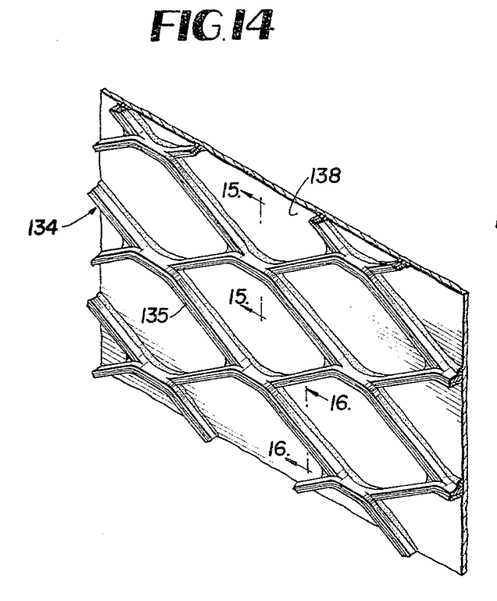
FIG. 14 is a view similar to FIG. 7 and showing a sandwich type reinforcing sheet bonded to the surface of a continuous cover sheet.
Figure 15:
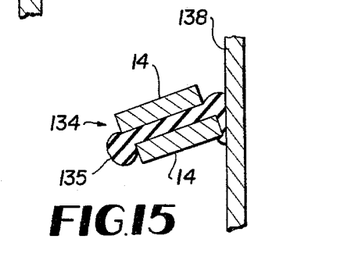
FIG. 15 is an enlarged sectional view taken on line 15—15 of FIG. 14.
Figure 16:
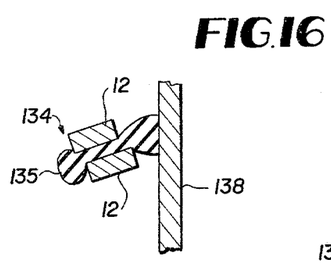
FIG. 16 is an enlarged sectional view taken on line 16—16 of FIG. 14.

In FIG. 14, a segment of the composite reinforcing sheet material 134 is illustrated as being bonded to the surface of a flat, continuous metal sheet 138. The appearance of this assembly differs somewhat in appearance from that of FIG. 7 in that, in the embodiment of FIG. 14, there is a visible bead 135 of foamed adhesive along the sheared edges of the expanded reinforcing sheet as a result of being extruded in both directions from between the constraining reinforcing sheets. This tendency is more clearly illustrated in FIGS. 15 and 16.

Figures 17, 18, 19:
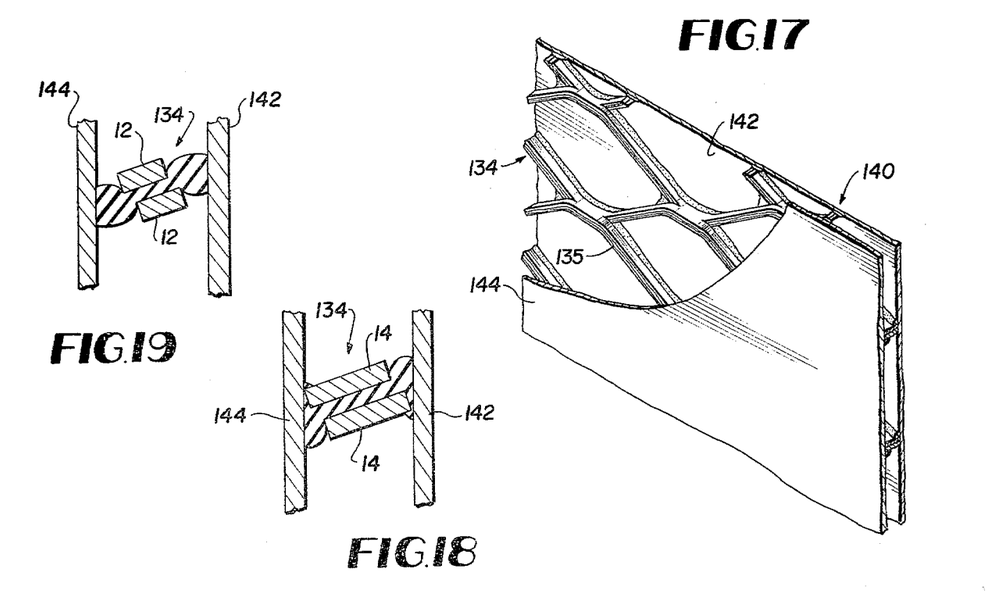
FIG. 17 is a fragmentary perspective view, with portions broken away, of a sandwich type reinforcing sheet material laminated between two structural cover sheets.
FIG. 18 is an enlarged fragmentary sectional view taken on line 18—18 of FIG. 17.
FIG. 19 is an enlarged fragmentary sectional view taken on line 19—19 of FIG. 17.

A further features of the embodiment employing a foamable adhesive captured between two expanded structural sheets is demonstrated in FIGS. 17-19 wherein the expanded reinforcing sheet 134 is employed in a sandwich structure 140 to firmly join two continuous structural sheets 142, 144 in spaced relation to one another much in the fashion of the well-known, high-strength honeycomb structural panels. Since the adhesive is extruded outward in both directions, an equal bond may be obtained on either side of the expanded reinforcing sheet material. The panel 140 is very stiff and has a high strength-to-weight ratio. It also has good sound insulation and vibration qualities, which, along with its relatively inexpensive construction, makes it particularly useful as a partition or wall panel.

In a modification of the expanded reinforcing sheet suitable for use for bonding between two spaced surfaces, a single structural sheet may have two layers of adhesive material bonded one to each face surface. When this laminate is expanded, both face surfaces of the strands and joints will be covered with adhesive so that an acute angle will be formed between a surface of an article, e.g., a cover sheet of structural material, and an adhesive covered face of the strands and joints on either side of the expanded reinforcing sheet.

Tests have revealed that structural sheet material reinforced with an expanded composite reinforcing sheet according to the present invention is extremely effective in providing a high stiffness-to-weight ratio while, at the same time, providing effective vibration dampening and sound insulation. This makes the reinforcing material an effective, inexpensive, light-weight reinforcing for various applications including the reinforcing of thin metal panels of the type employed, for example, in building panels, partitions, doors, automobile hoods and door panels, aircraft panels, and numerous applications where weight reduction, high strength and stiffness, or vibration or sound dampening are important objectives. The reinforcing sheet may be readily applied to a surface other than a flat surface, the sheet can be preformed to conform to the surface to be reinforced.

Reference frequently has been made herein to the intermittent type expanding apparatus for simultaneously slitting and expanding sheet material, and the expansion of sheet material on this type of apparatus is believed to be sometimes referred to in the art as a simultaneous expanding operation. The specification also frequently refers to the simultaneous expansion of the structural sheet and the foamable adhesive laminated thereon. It is in this latter since that the term "simultaneously expanding" is used in the claims with reference to the steps of expanding the structural sheet, or sheets, and the layer of foamable adhesive. Also, it is again pointed out that the term "foamable" is employed herein to refer to any type of volume expansion whether or not achieved by a true foaming process.

While preferred embodiments of the invention have been disclosed and described, it should be understood that the invention is so restricted and that it is intended to include all embodiments thereof which would be apparent to one skilled in the art and which come within the spirit and scope of the invention.

What is claimed is:

1. As an article of manufacture, a composite expanded reinforcing sheet comprising,
   an expanded structural sheet including a plurality of elongated strands interconnected at their ends by a plurality of integrally formed joints to define a pattern of generally diamond-shaped openings, said strands and joints being formed from a smooth flat sheet of structural material and each having generally flat face surfaces disposed at an acute angle to the plane of the expanded structural sheet, and
   a layer of foamable adhesive material covering and being firmly bonded to at least one flat face surface of the said strands and joints, the flat face surface of said strands and joints originally collectively defining the face surfaces of the flat sheet of structural material from which the expanded sheet was formed,
   said foamable adhesive being capable of being activated to expand and bond the composite reinforcing material to a surface of another structure.

2. The reinforcing sheet as defined in claim 1 wherein said foamable adhesive is a heat-activated adhesive.

3. The reinforcing sheet as defined in claim 1 wherein said foamable adhesive is a rubber based foamable adhesive material.

4. The reinforcing sheet as defined in claim 1 wherein said foamable adhesive is bonded directly to the surface of said strands and joints without the use of other bonding agents.

5. The reinforcing sheet as defined in claim 1 wherein said expanded structural sheet material is an expanded sheet metal.

6. The reinforcing sheet as defined in claim 5 wherein said foamable adhesive is a resilient heat-activated rubber based adhesive material.

7. The reinforcing sheet as defined in claim 1 wherein said layer of foamable adhesive covers and is bonded to one flat face surface only of the strands and joints.

8. The reinforcing sheet as defined in claim 1 further comprising a second expanded structural sheet consisting of a plurality of elongated strands interconnected at their ends by a plurality of integrally formed joints to define a pattern of generally diamond-shaped openings, said strands and joints of said second sheet being formed from a smooth flat sheet of structural material and each having generally flat face surfaces disposed at an acute angle to the plane of the second expanded structural sheet, and
   the two said expanded structural sheets being disposed in overlying, interfitting relation with one another with the strands and joints, respectively, of the two said expanded structural sheets being disposed in opposed, spaced, generally parallel relation to one another,
   said layer of foamable adhesive material being disposed between and firmly bonded to the opposed surfaces of said strands and joints of the two said expanded structural sheets.

9. The reinforcing sheet as defined in claim 8 wherein said foamable adhesive is a heat-activated adhesive.

10. The reinforcing sheet as defined in claim 8 wherein said foamable adhesive is a heat-activated rubber based foamable adhesive material.

11. The reinforcing sheet as defined in claim 8 wherein said foamable adhesive is bonded directly to the surface of said strands and joints without the use of other bonding agents.

12. The reinforcing sheet as defined in claim 8 wherein said first and second expanded structural sheets are expanded metal sheets.

13. The reinforcing sheet as defined in claim 12 wherein said foamable adhesive is a resilient heat-activated rubber.based adhesive material.

14. A structural panel comprising,
   a substantially flat structural sheet,
   an expanded reinforcing sheet including a plurality of elongated strands interconnected by a plurality of integrally formed joints, said strands and joints cooperating to define a pattern of generally diamond-shaped openings and each having a generally flat face surface disposed at an acute angle to the plane of the reinforcing sheet, and
   a layer of resilient, formed adhesive bonded to said generally flat face surface of said strands and joints and to said structural sheet to firmly join the structural sheet and the expanded reinforcing sheet to define said structural panel, said adhesive joining said strands and joints to said structural sheet along substantially their full lengths.

15. The structural panel of claim 14 wherein said structural sheet is a flat-rolled metal sheet and wherein said expanded reinforcing sheet is an expanded metal sheet.

16. The structural panel of claim 14 wherein said foamed adhesive is a rubber based, heat-activated foamed adhesive.

17. The structural panel of claim 14 further comprising a second substantially flat structural sheet, said structural sheets being disposed one on each side of said expanded reinforcing sheet, and
    a second layer of resilient foamed adhesive bonded to the other flat face surface of the strands and joints and to the second substantially flat structural sheet.

18. A structural panel comprising,
    a pair of expanded structural sheets each made up of a plurality of elongated strands interconnected by a plurality of integrally formed joints to define a pattern of substantially diamond-shaped openings, said expanded sheets being disposed in overlying relation with the strands and joints of the respective expanded sheets having face surfaces disposed in opposed and substantially parallel spaced relation to one another with said opposed face surfaces being disposed at an acute angle to the plane of the respective expanded sheets,
    a layer of foamed adhesive material disposed between and firmly bonded to said opposed surfaces and retaining said pair of expanded sheets in said overlying interfitting relation to define a core for the structural panel, and
    a pair of substantially flat structural sheets mounted one on each side of said core, said layer of adhesive material extending outwardly from said opposed surfaces on each side of said core and firmly bonding the core to said cover sheets to form said structural panel.

19. The structural panel of claim 18 wherein said cover sheets each comprise a flat-rolled metal sheet.

20. The structural panel of claim 19 wherein said pair of expanded structural sheets each comprise an expanded metal sheet.

21. The structural panel of claim 20 wherein said foamed adhesive comprises a rubber based heat-activated foamed adhesive.

* * * * *

UNITED STATES PATENT AND TRADEMARK OFFICE
CERTIFICATE OF CORRECTION

PATENT NO. : 4,259,385
DATED : March 31, 1981
INVENTOR(S) : Robert N. Keller

It is certified that error appears in the above-identified patent and that said Letters Patent are hereby corrected as shown below:

Col. 3, line 16, correct the spelling of "spreading".

Col. 5, line 16, correct the spelling of "thickness".

Col. 9, line 14, correct the spelling of "hereinabove".

Col. 10, line 44, delete "features" and insert --feature--.

Col. 12, line 55, delete "formed" and insert --foamed--.

Signed and Sealed this

Twenty-third Day of June 1981

[SEAL]

Attest:

RENE D. TEGTMEYER

Attesting Officer    Acting Commissioner of Patents and Trademarks